United States Patent [19]

Do et al.

[11] Patent Number: 4,942,390
[45] Date of Patent: Jul. 17, 1990

[54] METHOD AND APPARATUS FOR GENERATING A CHARACTER IMAGE

[75] Inventors: Phuc K. Do, Charlotte; Karen K. Kellam, China Grove; Ronnie Chi-on Tong, Charlotte; Ronald W. Willis, Kannapolis; Carol E. Wyke, Charlotte, all of N.C.

[73] Assignee: International Business Machines Corporation, Armonk, N.Y.

[21] Appl. No.: 33,296

[22] Filed: Apr. 1, 1987

[51] Int. Cl.[5] .................................................. B41J 3/12
[52] U.S. Cl. ...................................... 340/735; 340/750; 400/121
[58] Field of Search ............... 340/735, 728, 731, 744, 340/737, 738, 746, 748, 750, 799; 283/1 R; 400/124, 121; 375/122; 358/260, 264; 382/56; 364/519, 521

[56] References Cited

U.S. PATENT DOCUMENTS

| | | | |
|---|---|---|---|
| 3,213,268 | 10/1965 | Ellersick | 375/122 |
| 3,893,100 | 7/1975 | Stein | 340/336 |
| 4,068,224 | 1/1978 | Bechtle et al. | 358/260 |
| 4,168,489 | 9/1979 | Ervin | 340/731 |
| 4,181,973 | 1/1980 | Tseng | 364/900 |
| 4,353,653 | 10/1982 | Zimmerman | 400/70 |
| 4,400,791 | 8/1983 | Kitado | 364/900 |
| 4,451,899 | 5/1984 | Yamazaki | 340/731 |
| 4,458,333 | 7/1984 | Smith | 364/900 |
| 4,467,363 | 8/1984 | Tench, Jr. | 358/261 |
| 4,508,463 | 4/1985 | Wang et al. | 400/124 |
| 4,573,199 | 2/1986 | Chen et al. | 382/47 |
| 4,660,999 | 4/1987 | Tsuneki | 364/519 |
| 4,704,040 | 11/1987 | Takano et al. | 400/121 |
| 4,707,153 | 11/1987 | Nishi et al. | 340/731 |

OTHER PUBLICATIONS

IBM Technical Disclosure, "Font Compression in High Resolution Printers", Bresenham et al., vol. 25, No. 9 Feb. 1983.
Brown et al., "Variable Size Print Characters", IBM Technical Disclosure Bulletin, vol. 27, No. 5, Oct. 1984.
Data Compression, Gilbert Held, pp. 20-31.
IBM Technical Disclosure Bulletin-Jan. 1986 p. 3563-Compression/Decompression of Font Patterns.
IBM Technical Disclosure Bulletin-Feb. 1983, p. 4582-Font Compression In High Resolution Printers.

Primary Examiner—Alvin Oberley
Attorney, Agent, or Firm—Dale Curtis Hogue, Sr.

[57] ABSTRACT

This invention relates to a method for generating character images using a font compression algorithm that reduces the storage requirements associated with low-cost, high resolution printers. An expanded character image has original print slices and duplicate print slices identical to one or more of the original print slices where the duplicate print slices are eliminated in the compressed character image. The compressed character is expanded using a repetition mask that identifies the number and location of the duplicate print slices. The technique for expanding the compressed character is such that printing can be performed in real time, in either a forward or reverse direction with only minimal effects on processing. This invention also provides a means for supporting multiple pitches, such as 10 CPI, 12 CPI and Proportional Space Mode (PSM), within those storage constraints. The technique of this invention is efficient enoughh to be performed by microcode in real time, yet provides for significant reduction in the overall memory required for storing the font data.

8 Claims, 18 Drawing Sheets

Fig. 9

| | 1 | 2 | 3 | 4 |
|---|---|---|---|---|
| 1 | | ■ | ■ | |
| 2 | | ■ | ■ | |
| 3 | | ■ | | |
| 4 | | ■ | | |
| 5 | | ■ | | |
| 6 | | ■ | | |
| 7 | | ■ | | |
| 8 | | ■ | | |
| 9 | | ■ | | |
| 10 | | ■ | | |
| 11 | | ■ | | |
| 12 | | ■ | | |
| 13 | | ■ | | |
| 14 | | ■ | | |
| 15 | | ■ | | |
| 16 | | ■ | | |
| 17 | | ■ | | |
| 18 | | ■ | | |
| 19 | | ■ | | |
| 20 | | ■ | | |
| 21 | | ■ | ■ | |
| 22 | | ■ | ■ | |
| 23 | | | | |
| 24 | | | | |

PRINT POSITIONS

Fig. 10

MASK FOR 10 CPI "B"

0 1 0 1 1 0 1 1 0 1 1 1 1 1 1 1 0 0 0 0 0 0 1
|                                                   |
STARTING POINT ––––––––––––––⟶ ENDING POINT

MASK FOR 12 CPI "B"

0 0 1 1 0 1 1 0 1 1 1 1 1 1 0 0 0 0 0 0
|                                   |
STARTING POINT ––––––––⟶ ENDING POINT

MASK FOR PROPORTIONAL SPACING "B"

0 1 1 0 1 1 0 1 1 0 1 1 1 1 1 1 1 1 1 0 0 0 0 0 1 1
|                                                          |
STARTING POINT ––––––––––––––––⟶ ENDING POINT

MASK FOR 10 CPI "E"

0 1 1 1 1 0 1 1 0 1 1 1 1 1 1 1 0 1 1 1 1 1 1
|                                        |
STARTING POINT –––––––––––⟶ ENDING POINT

Fig. 11

MASK FOR 10 CPI "B" AFTER ROTATE LEFT 1 BIT

```
    1 0 1 1 0 1 1 0 1 1 1 1 1 1 1 1 0 0 0 0 0 0 1 0
    |                                               |
  ENDING POINT ------------------- STARTING POINT
```

MASK FOR 12 CPI "B" AFTER ROTATE LEFT 1 BIT

```
    0 1 1 0 1 1 0 1 1 1 1 1 1 0 0 0 0 0 0 0
    |                                       |
  ENDING POINT ---------- STARTING POINT
```

MASK FOR PROPORTIONAL SPACING "B" AFTER ROTATE LEFT 1 BIT

```
    1 1 0 1 1 0 1 1 0 1 1 1 1 1 1 1 1 1 1 0 0 0 0 0 0 1 1 0
    |                                                       |
  ENDING POINT -------------------------- STARTING POINT
```

MASK FOR 10 CPI "L" AFTER ROTATE LEFT

```
    1 1 0 1 0 1 1 0 1 1 1 1 1 1 1 0 1 1 1 1 1 1 1 0
    |                                               |
  ENDING POINT ------------------ STARTING POINT
```

METHOD AND APPARATUS FOR GENERATING A CHARACTER IMAGE

TECHNICAL FIELD

This invention relates to character generation in matrix printers and more specifically to a method and apparatus for bidirectionally printing characters in various pitches from compressed character data.

BACKGROUND ART

With the increasing popularity of high resolution printers, also known as letter quality printers, such as 24 wire, resistive ribbon, ink jet and electrophotographic printers the amount of storage required to store the character generator has risen exponentially. Moreover, now that output of the printer is of a much higher quality there is a demand by users for greater variety in the number of type fonts that are available to them and also a desire to have the characters print in different pitches. The conventional way of supporting multiple type fonts and pitches is to create a character generator for each font and for each individual pitch. Each character generator, however, requires a certain quantity of memory and for higher resolutions, that quantity can be substantial.

Although the cost of memory per byte is decreasing, it nevertheless remains a significant factor in the design of computer printers. As an example, a 24 wire printer with a 24 × 24 character cell size increases the memory requirements by approximately 600% as compared to the popular 9 wire printers having a 9 × 12 character cell size. This increase is then multiplied by the number of fonts and pitches that must be included with the printer.

To accommodate the large character generator storage requirements, additional storage has to be added to the printer. Often the available storage is insufficient to store all characters which could be included if storage were not a concern. If the character generator storage requirements are reduced, significant efficiencies are achieved in that the overall storage requirements are reduced making more storage available for additional characters and printer microcode.

In U.S. Pat. No. 4,353,653 to Zimmerman for Font Selection and Compression For Printer Subsystem a method is taught for storing a base font with the blank slices eliminated, see col. 37 line 53 through col. 38, line 28. The printer responds to a character data stream by selecting the designated font and the appropriate character in real time, however, no provision is made for dynamically changing the character pitch in real time. IBM Technical Disclosure Bulletin, Jan. 1986, page 3563, entitled Compression/Decompression of Font Patterns also describes a technique for eliminating blank data slices. The technique of this TDB article teaches constructing a compressed character comprised of control bytes followed by data bytes. The control bytes designate the number and location of the blank slices.

Another technique for compressing printer font data is described in U.S. Pat. No. 4,458,333 to Smith for Dot Matrix Character Printing Using Constrained Memory. The method described in that patent includes the step of prestoring only a portion of the dot matrix defining the character, together with information designating at least one axis of reflective symmetry. Only those characters having at least one axis of reflective symmetry are amenable to the compression scheme of this patent. Two methods for decompressing the font data are described depending on the print head's direction of travel. No provision is made for changing the character pitch in real time.

In U.S. Pat. No. 4,467,363 to Tench for Graphic Data Compression a technique is described that constructs characters using only a sequence of commands. Each command consists of a prefix code and a content code. The prefix code determines one of three modes: continuous string, repeat column or bit-for-bit specification. The content code is a numerical parameter for the prefix code. Using the technique of this patent, characters are stored as a set of instructions and to reconstruct the character the entire instruction set must be executed. For example, if the prefix code designates the repeat column mode, the content code specifies the number of repetitions. Prior commands would generate the column; data depicting the character image is not stored, only instructions to the processor on where to place dot elements. Then a command to repeat the column a certain number of times would be processed. Such a method requires a substantial amount of processing time to reconstruct a character and no provisions are made for printing the character in different pitches or in either a forward or reverse direction.

U.S. Pat. No. 4,181,973 to Tseng for Complex Character Generator together with U.S. Pat. No. 4,573,199 to Chen et al. for Kanji/Chinese Font Generation By Scaling teach a technique for compressing font characters and scaling those characters for printing in different pitches. In the patent to Tseng, a set of symbols (or sub-matrices) are defined for the entire set of characters in the character set. For each character, a set of addresses pointing to the symbols necessary for generating a character are stored. The Chen et al. patent adds to the Tseng patent by inserting horizontal and vertical lines into the stored font to effect vertical and horizontal expansion.

A technique similar to that disclosed in the Tseng patent is described in IBM Technical Disclosure Bulletin, Feb. 1983, page 4582 entitled Font Compression In High Resolution Printers. There, a table is constructed containing vertical slices of character data which commonly occur in sequence in the font. For example, the sequence of slices representing the vertical stroke at the lift of a 'B' or 'D'. The characters in the font are represented by strings of table addresses.

SUMMARY OF THE INVENTION

While each of the foregoing techniques do achieve the objective of reducing the font data required by the printer for producing characters, they have certain disadvantages. First, the techniques of the prior art generally require significant amounts of processing time to perform decompression. One of the advantages of this invention is that a minimal amount of processing is required for expanding the compressed character. Another disadvantage of the prior art is the difficulty in printing characters in multiple pitches. This invention offers a greater number of character pitches than was hitherto available, all with little or no increase in the base character data or increasing the time required to decompress the character. Another significant disadvantage of the prior art is the inability to expand the characters in a way that is readily amenable to bidirectional printing. With this invention, printing the expanded characters in either a forward or reverse direction is accomplished with little effect on processing time. This invention for a method and apparatus for generating character images provides a way for economically storing font data with the synergistic result that multiple pitches are readily available in an efficient way that is readily amenable to printing characters bidirectionally.

A printer incorporating this invention includes a character generator containing the character images for the printer's internal font. A character image consists of a series of print slices, each print slice having one or more print positions, each print slice defining only one dot column of the character. In a 24 wire printer, for example, three bytes are required to define the 24 possible print positions in a column or print slice. A 1 bit in a print position corresponds to a dot being printed in that print position. A 0 bit in a print position corresponds to a dot not being printed in that print position. Character font design involves the arranging of print positions or dots in such a manner as to produce the character image by printing a series of print slices that comprise the entire character.

In a majority of characters, many situations exist where a print slice is followed by one or more print slices that are identical to the preceding print slice. This means that when viewing the print slices of a character there may be consecutive print slices that are identical. Consecutive identical print slices are more common with the higher resolution printers now available; since the size of the printed dot has decreased, so multiple identical print slices must be printed in order to produce an acceptable character.

Since no new data is obtained from the consecutive and equal print slices, these duplicate print slices are not required and therefore do not need to occupy valuable storage. In this invention only the first print slice of a series of repetitive print slices is actually stored in the character generator. By storing only the first print slice of a series of equal print slices, only the non-repetitive print slice data is stored in the character generator. Since the number of print slices that can be eliminated for each character varies, the amount of storage required for each character will also vary. Each character in the font has a corresponding entry in a character pointer table which points to the actual start position of the character in the character generator storage. The first three bytes stored in the character generator for each character are attribute bytes. These three attribute bytes are used as the repetition mask for reconstructing the eliminated print slices.

The processing required to expand the reduced font is greatly simplified with the addition of the three attribute bytes for each character. The 24 bits of the three attribute bytes are used to define the 24 print slices of the character. For each print slice to be printed, the corresponding attribute bit will be examined. If the attribute bit for a print slice is a 0 bit, then the print slice to be printed is a new print slice and must be fetched from the character generator storage. If the attribute bit for a print slice is a 1 bit, then the print slice to be printed is a duplicate print slice which is the same as the last print slice fetched from the character generator and so no fetching of a print slice occurs. Since no print slices are fetched when the attribute bit is a 1 bit, processing time is freed for other activities. As an example of the benefits offered by this invention, eliminating the repetitive print slice data of a 24 by 20 dot matrix character font will reduce the character generator storage requirements from approximately 15K bytes to approximately 8.964K bytes, even after adding back the three attribute bytes per character and a 512 byte character pointer table. In that example, by eliminating repetitive print slice data, a savings of 40.2% or 6.03K bytes is achieved.

This invention also provides an efficient means of reducing the amount of memory required to store multiple pitches of a particular character font. By eliminating or adding one or more of excess duplicate print slices, characters can be narrowed or widened to correspond to different pitches. The print slices to be added or eliminated are identified in the repetition mask. Thus, additional character pitches are made available by storing only additional mask information. As an example, if three pitches (10 pitch, 12 pitch and proportional spaced mode (PSM)) were implemented in the conventional way, 50K bytes of memory would be required to store one font in three pitches. With this invention, it will only take approximately 9K bytes to store the character image and 1.25K bytes each for the character pointers and the repetition masks. This total is approximately 13K bytes, which is only 25% of the conventional storage requirement and amounts to a substantial benefit.

This invention further provides a technique for printing the expanded character image in either a forward or reverse direction. This is accomplished by rotating the repetition mask one position to the left when printing occurs in the reverse direction. By definition, the first print slice of a new character image is new, as the data is stored with the presumption of printing from left to right the first bit of the repetition mask always signifies a unique or new print slice. By translating the first bit of the mask to the end position of the mask, thus always treating the last print slice as unique when printing from right to left, and then constructing the character in reverse order, bidirectional printing is accomplished with no effect on the real time processing capabilities of the system.

BRIEF DESCRIPTION OF THE DRAWINGS

Referring now to the drawings, wherein like reference numerals are used to designate like parts, a preferred embodiment of the invention is described.

FIG. 9 shows an enlargement of the stored character data used to generate the graphic character of FIGS. 7 and 8;

FIG. 10 illustrates the masks used to generate FIGS. 1 through 5, 7, and 8;

FIG. 11 illustrates the compensated masks for printing the characters of FIGS. 1 through 5, 7 and 8 in a reverse direction;

DETAILED DESCRIPTION OF THE PREFERRED EMBODIMENT

The details of making a printer incorporating this invention are well known to those skilled in the art and will not be duplicated here. An example of prior art printers that could usefully adopt this invention are the IBM Models 4201 and 4202 Proprinter.

Throughout the detailed description of this invention, the characters will be described on the basis of a 24 × 24 dot matrix. The concepts of this invention, however, apply equally well to matrices having different dimensions.

Figure 1:
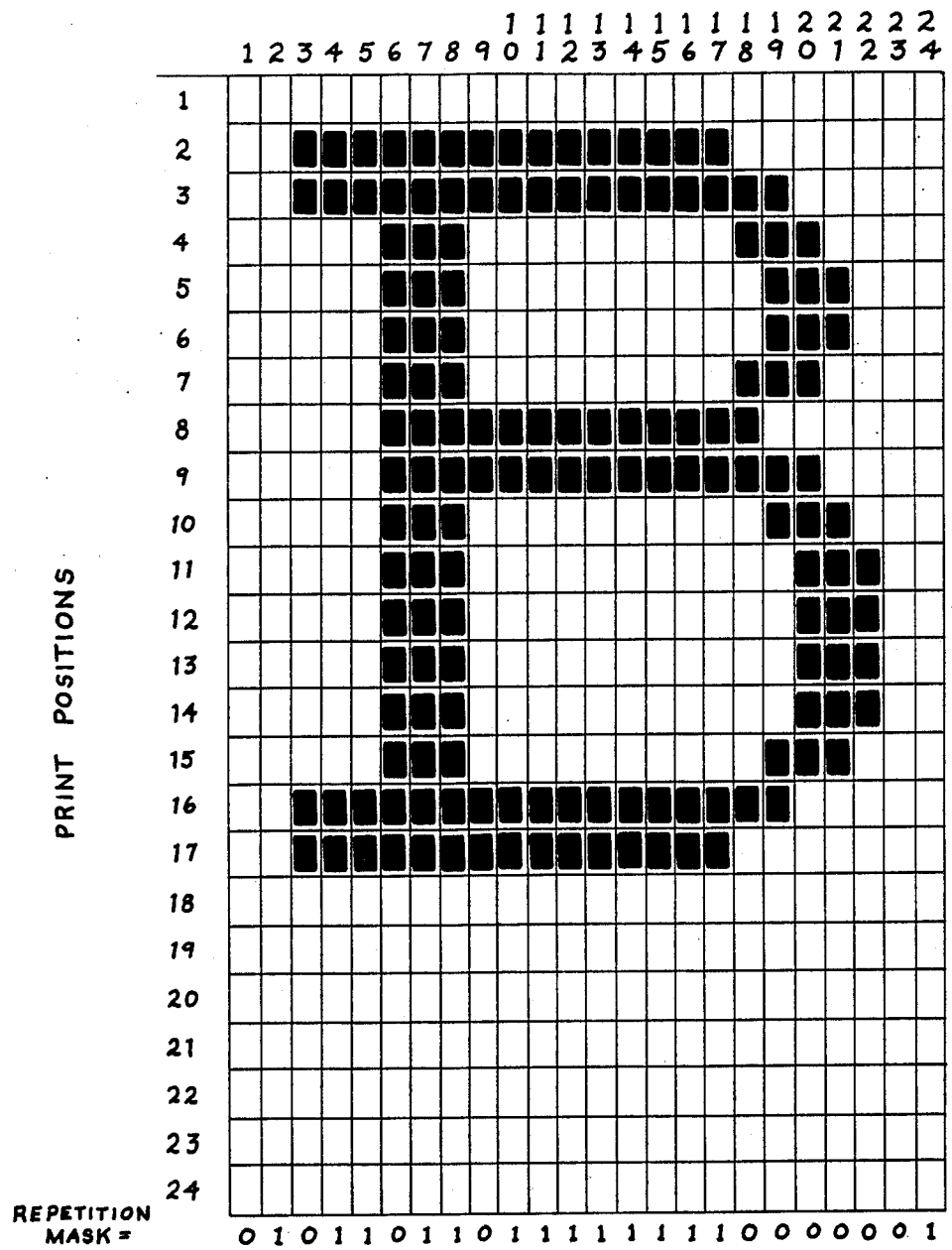
FIG. 1 shows an enlargement of a full character printed at 10 cpi.
Figure 6:
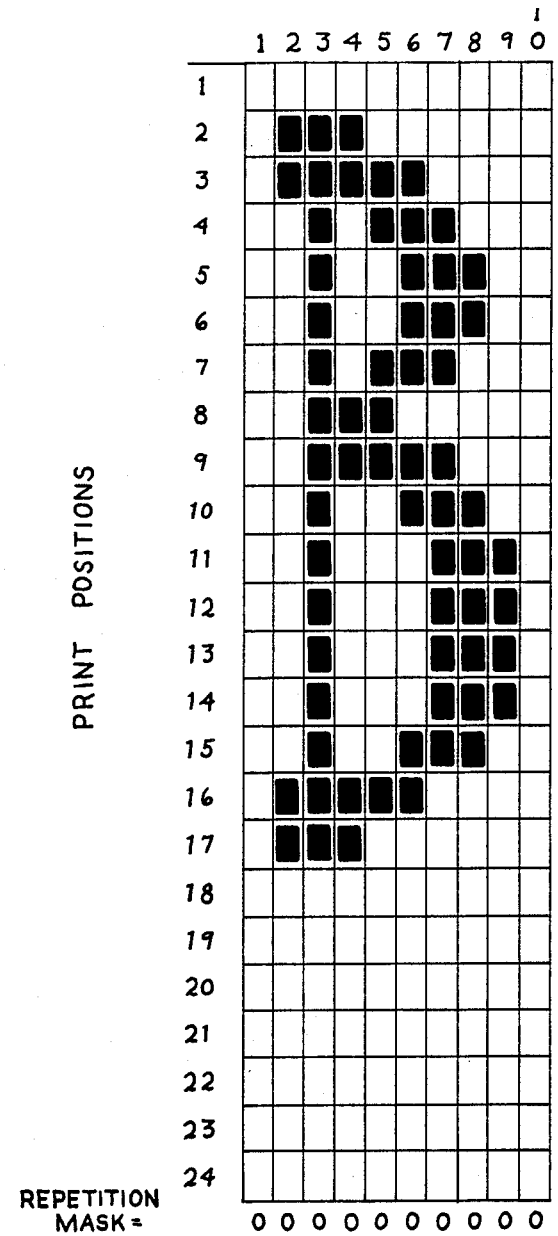
FIG. 6 shows an enlargement of the stored character data used to generate the characters of FIGS. 1 through 5.

FIG. 1 is an enlargement showing the normal character image for a B printed at 10 cpi. The row positions are identified on the left side of the figure and the column positions, or print slices, are identified along the top of the figure. The mask for generating the character image according to the invention is shown at the bottom of the figure. A 0 bit in the repetition mask signifies a new print slice, while a 1 bit in the mask signifies duplicating the previous print slice. Print slice 1 and print slice 2 are equal, so only print slice 1 would be stored in the reduced character generator. Print slices 3, 4 and 5 are equal, so only print slice 3 is stored in the reduced character generator. Print slices 6, 7 and 8 are equal so only print slice 6 is stored in the reduced character generator. Since print slices 9 through 7 are equal, only print slice 9 is stored in the reduced character generator. Print slices 18 through 22 are unique so each will be stored in the reduced character generator. Print slices 23 and 24 are equal, so only print slice 23 will be stored in the reduced character generator. FIG. 6 shows the reduced character image actually stored for the B of FIG. 1. It is evident that all consecutive identical print slices have been eliminated.

Figure 2:
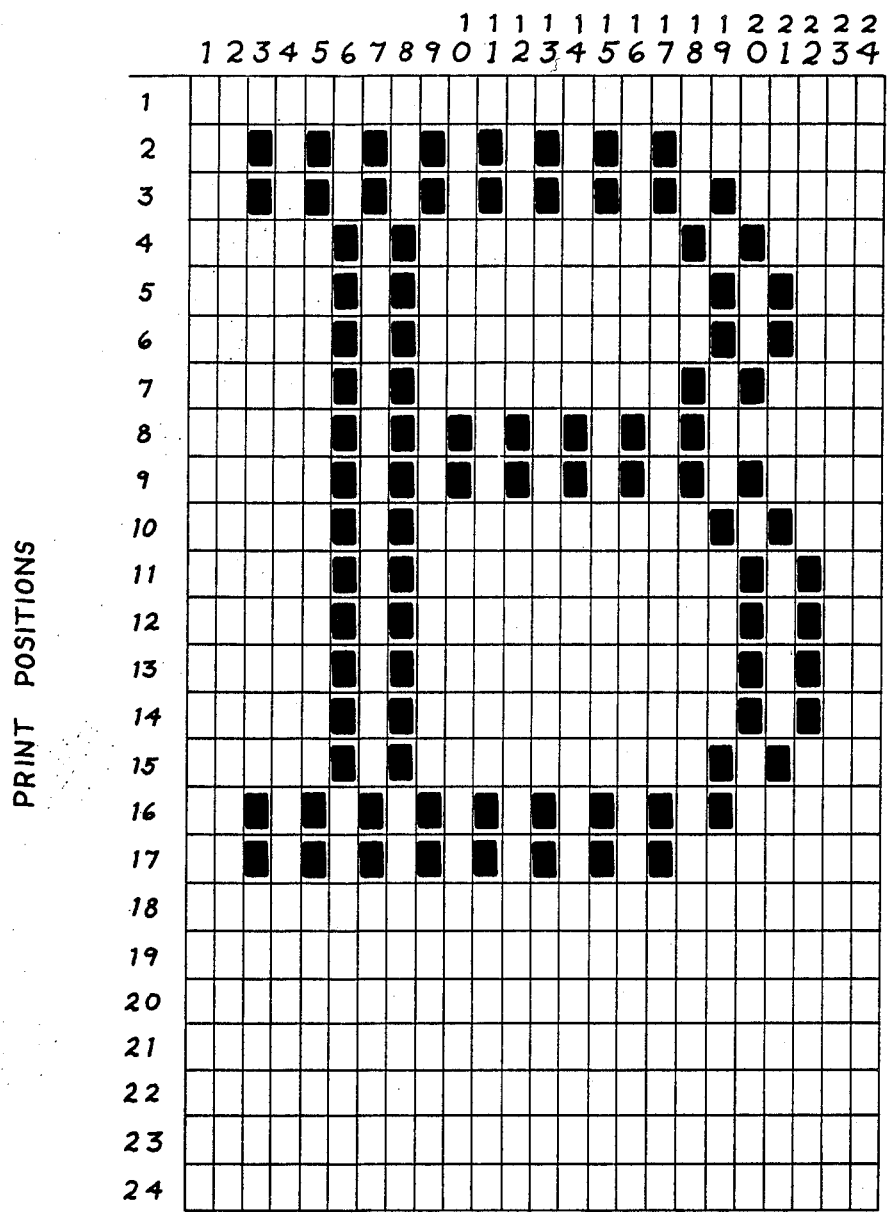
FIG. 2 shows an enlargement of the full character of FIG. 1, as printed, illustrating the results of inter-dot elimination.

In a dot printer, the operation of placing dots on the record medium prevents the production of dots in consecutive print columns. This is known as inter-dot elimination and is fully explained in U.S. Pat. No. 3,627,096 to Finnegan for Wire Printing Method. Because of inter-dot elimination, the actual character image printed on the record medium is depicted in FIG. 2. In actual operation, the dots are close enough together to make for a high quality output. In designing the font characters, it is important to note that in an expanded character consecutive horizontal print positions should be stored in odd number multiples to avoid any detrimental effects of inter-dot elimination on bidirectional printing.

Figure 16A:
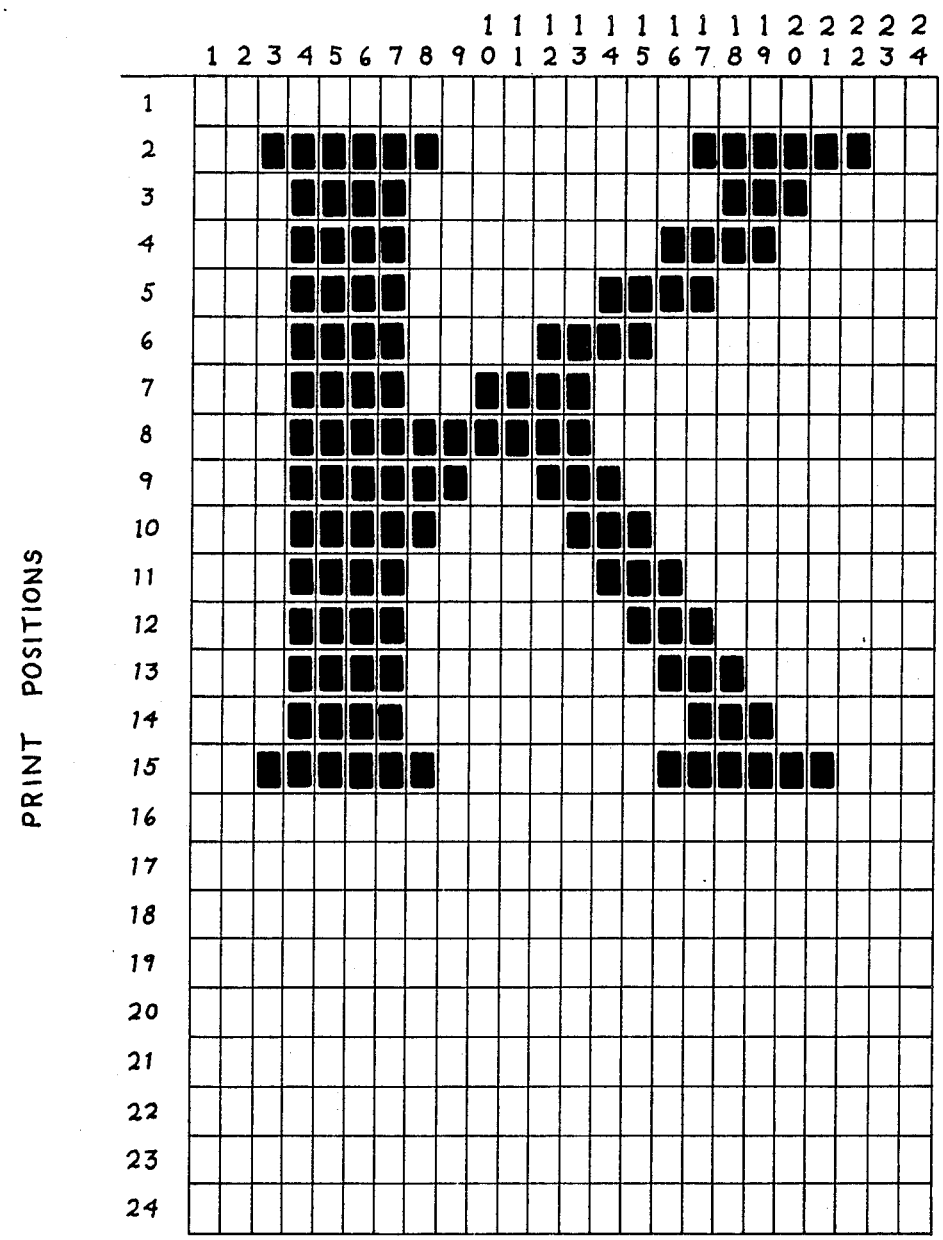
FIGS. 16A, 16B and 16C illustrate a design consideration resulting from the effect of inter-dot elimination on bidirectional printing.
Figure 16B:
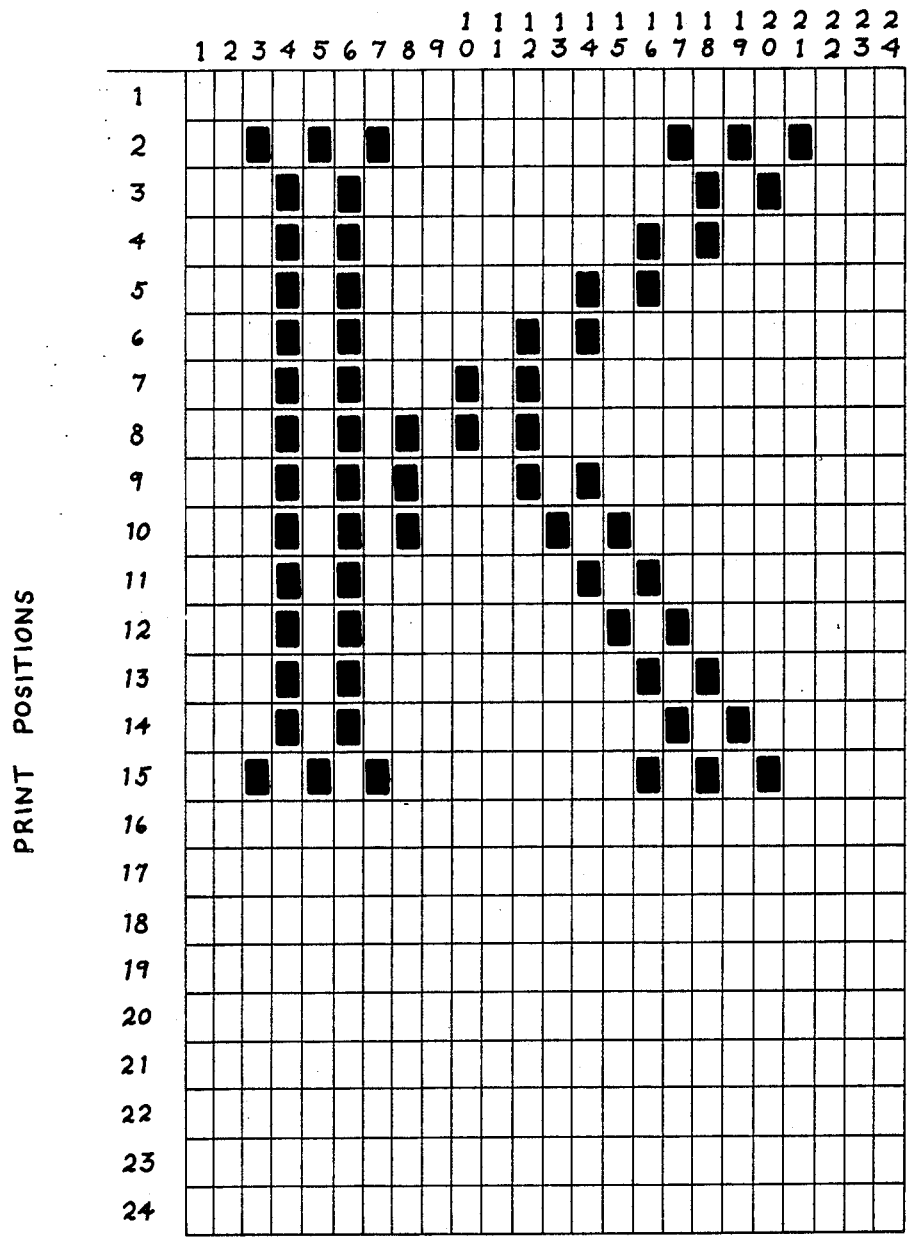
Figure 16C:
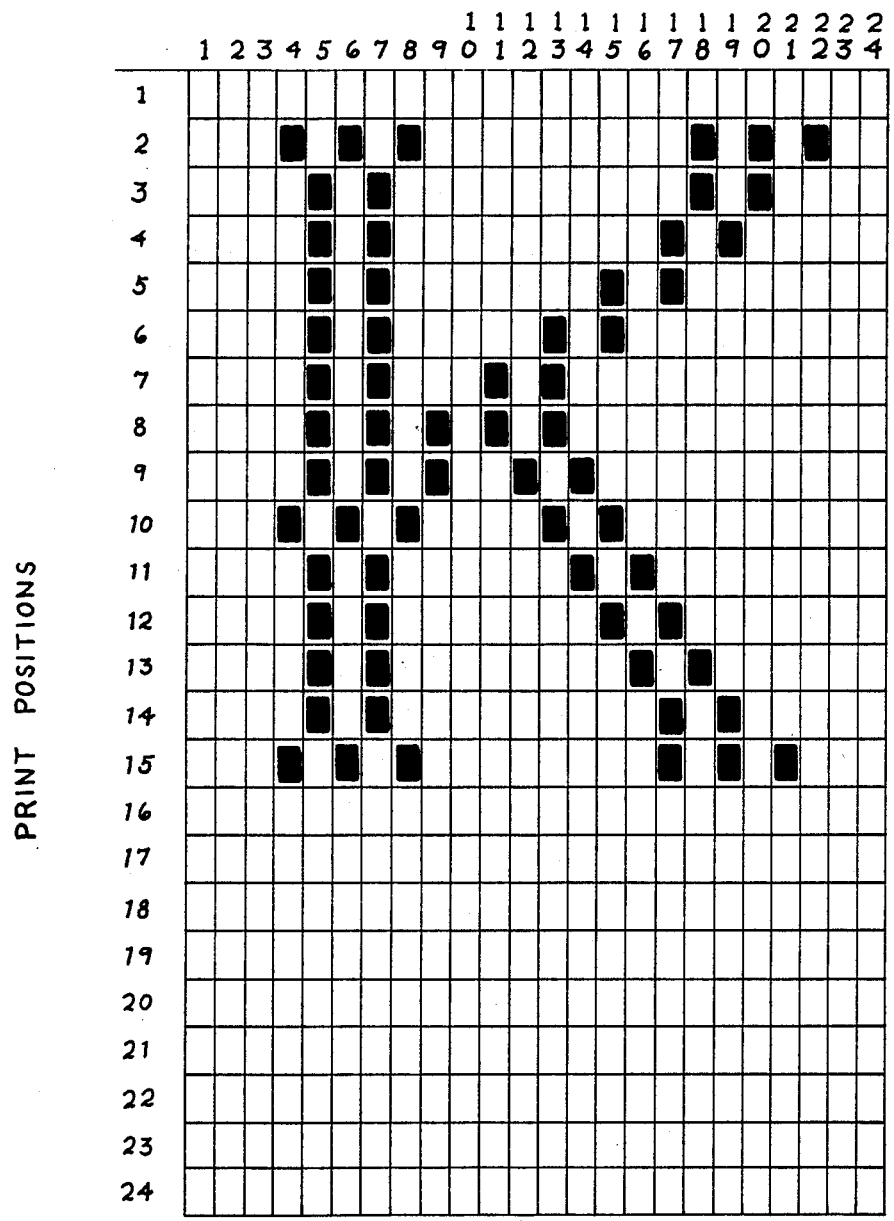

Referring to FIG. 16A, an expanded character is depicted having an even number of duplicate horizontal print positions in slices four through seven. In FIG. 16B, printing left to right produces a properly formed character while in FIG. 16C, printing from right to left, the dots in print position ten are out of alignment producing an improperly formed character. This problem is avoided by selecting an expanded character where there is always an odd number of dot positions in the horizontal direction.

Figure 3:
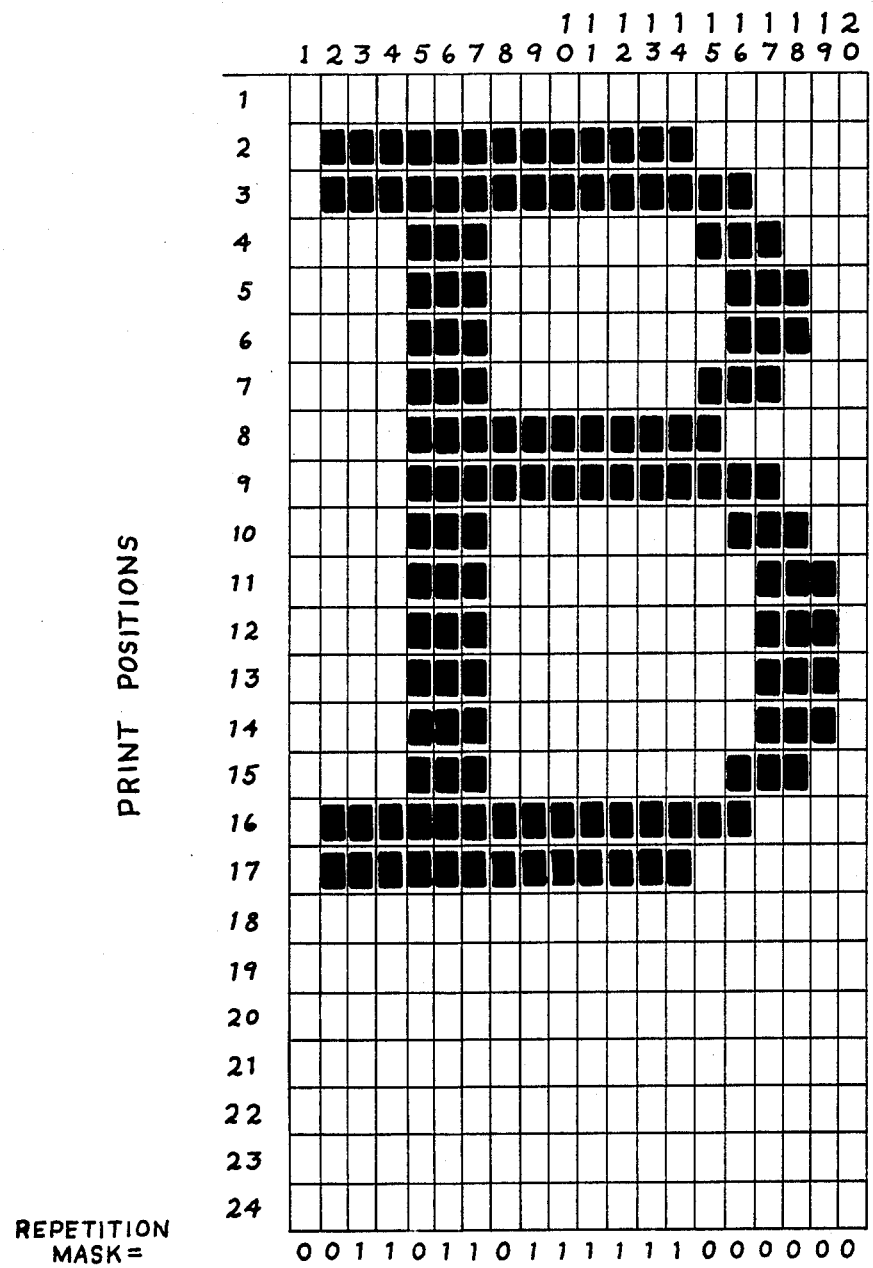
FIG. 3 shows an enlargement of the full character of FIG. 1 printed at 12 cpi.

FIG. 3 shows an enlarged B printed at 12 cpi and thus four print slices are eliminated to produce a character matrix of 24 × 20 dots. The eliminated slices are determined by the repetition mask. The mask of FIG. 3 operates on the character image data of FIG. 6 in the same way the repetition mask of FIG. 1 operates on the data of FIG. 6. By constructing the appropriate masks, the entire character set of the font can be printed in different pitches. Again, note that in the expanded character all groups of horizontal print positions occur in odd numbered multiples.

Figure 4:
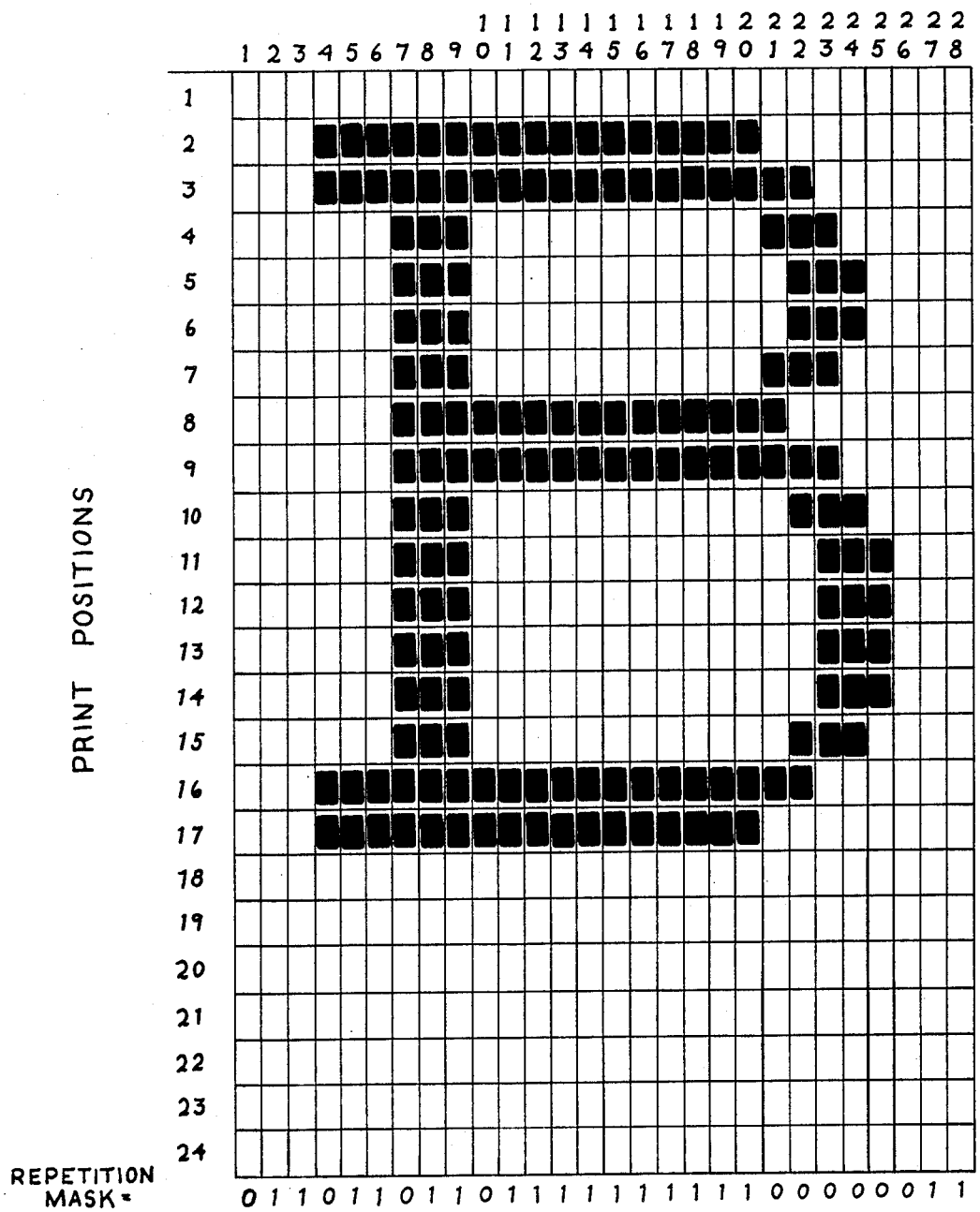
FIG. 4 shows an enlargement of the full character of FIG. 1 printed in proportional spaced mode (PSM)
Figure 5:
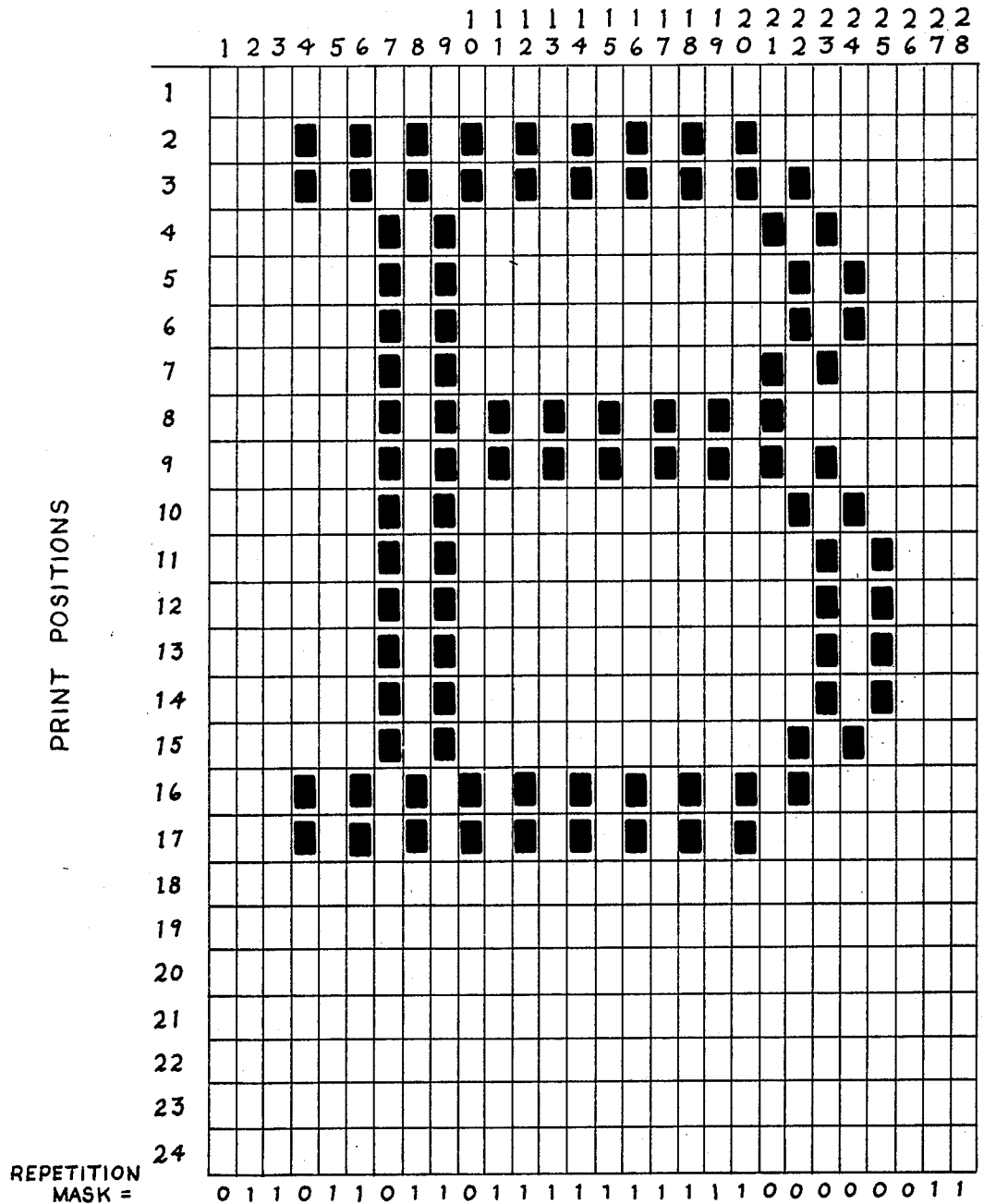
FIG. 5 shows an enlargement of the full character of FIG. 4, as printed, illustrating the results of inter-dot elimination.

FIGS. 4 and 5 illustrate another pitch, in this case the character is printed in Proportional Space Mode (PSM) using 28 print slices. Once again, the image data of FIG. 6 is expanded using an appropriate mask, bottom row of FIG. 4, to produce the B in PSM. FIG. 5 is an enlarged view of the actual printed character illustrating inter-dot elimination.

Figure 7:
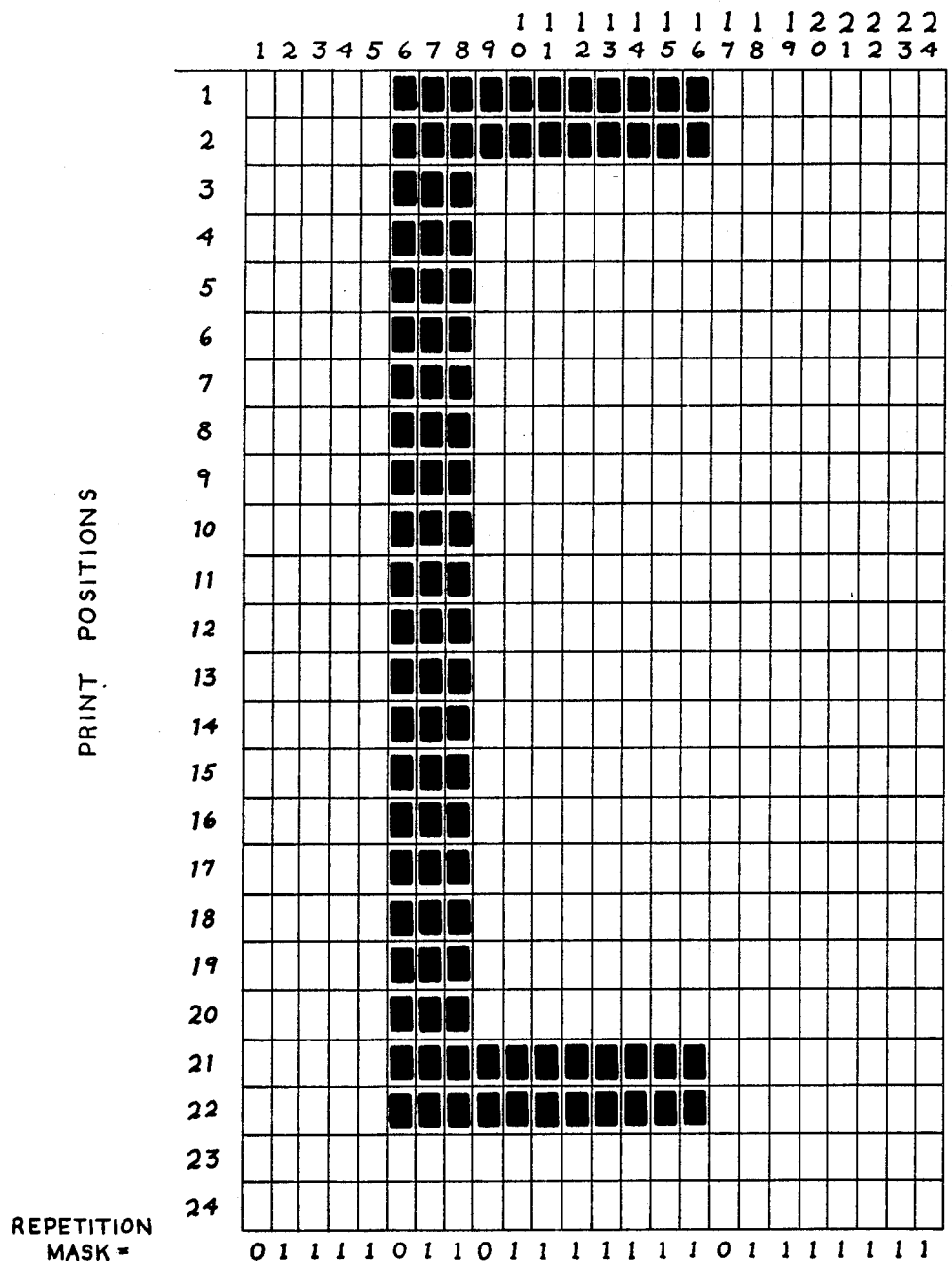
FIG. 7 shows an enlargement of a full graphic character printed at 10 cpi.
Figure 8:
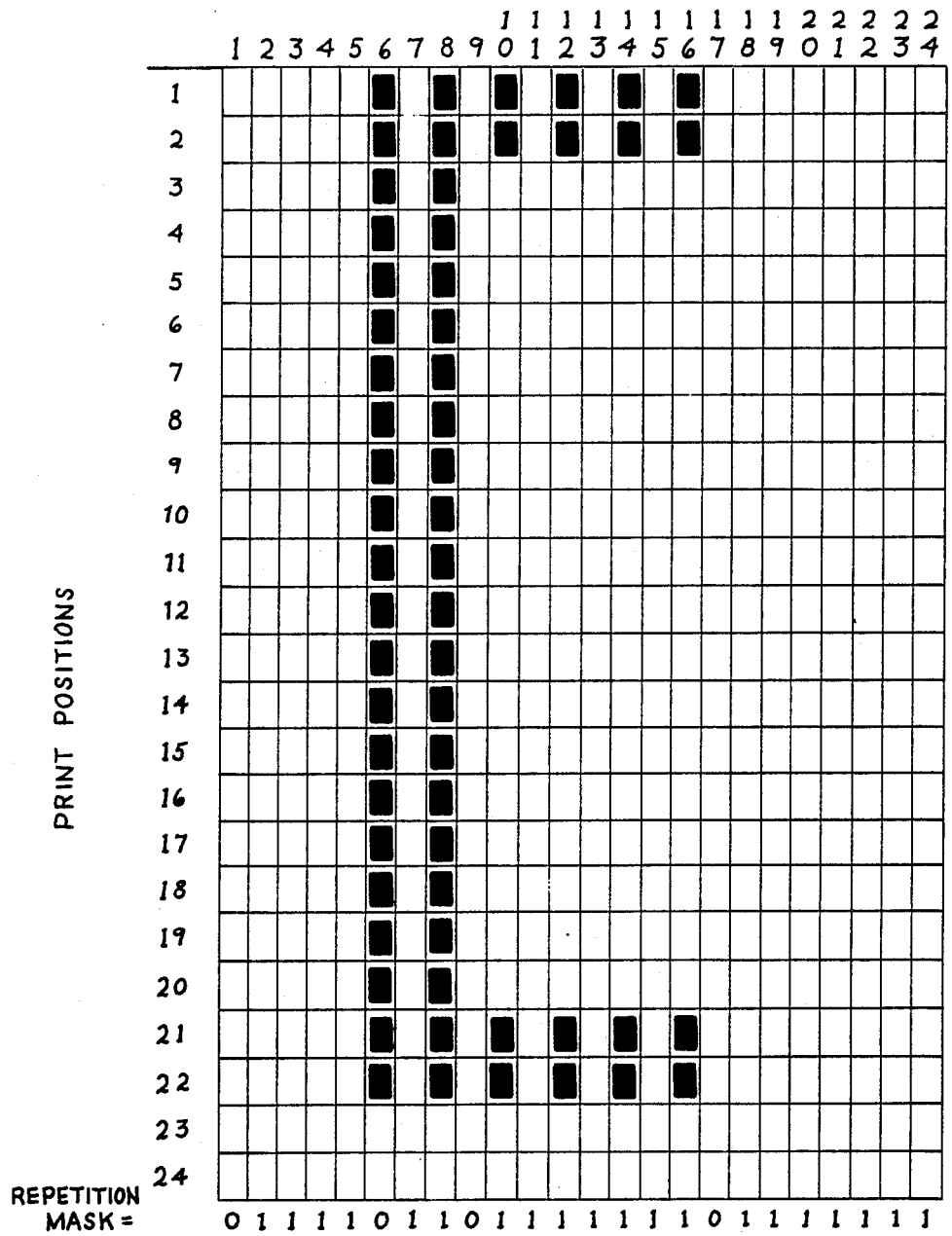
FIG. 8 shows an enlargement of the character of FIG. 7 as printed, illustrating the results of inter-dot elimination.

FIG. 7 shows the character image for a left bracket [. Print slices 1 through 5 are equal, so only print slice 1 is stored in the reduced character generator. Print slices 6 through 8 are equal, so only print slice 6 is stored in the reduced character generator. Print slices 9 through 16 are equal, so only print slice 9 is stored in the reduced character generator. Print slices 17 through 24 are equal, so only print slice 17 is stored in the reduced character generator. In this example, a character image consisting of 24 print slices is reduced to a 4 slice character image by eliminating repetitive print slices. FIG. 8 is an enlarged view of the actual printed character illustrating inter-dot elimination and FIG. 9 shows the actual reduced character image for the left bracket [ that is stored in memory.

Referring now to FIG. 10, the function of the repetition mask is explained in more detail. The x bit of the repetition mask is used to define the x print slice of the character (for example, bit 1 gives information about slice 1 of the character; bit 2 refers to slice 2, etc.). If the repetition mask bit for a print slice is a 0, then the print slice to be printed is a new print slice, meaning it is different from the previous slice, and must be fetched from the character generator storage. If the repetition mask bit for a print slice is a 1 bit then the print slice to be printed is a duplicate print slice, meaning that it is the same as the last print slice that was fetched from the character generator so no fetching of a print slice occurs.

By appropriate design of the repetition mask, multiple pitches can be made available to the user. For example, suppose, after compression, only 12 slices of a character were stored using the above method, where the original character had 24 slices. In addition, suppose the printer resolution is 240 dots/inch. This means that to produce a 10 pitch character, 24 slices must be printed. Therefore, in order to print the character that was compressed to 12 slices, an additional 12 slices must be selectively inserted. This selective insertion is accomplished by using the repetition mask as described above.

Continuing the example above, suppose a 12 pitch character is to be printed using the same compressed character data of 12 slices. This means that 20 slices need to be printed, instead of 24. Only 8 slices must be selectively inserted. In other words, by using a different repetition mask from the one used to generate the 10 pitch character, a 12 pitch character can be printed using the same character generator data. This new mask is created by finding sequences of 1 bits in the original mask and removing enough of those 1 bits to get the desired pitch —for this example, four 1 bits need to be removed. To further illustrate, suppose the original mask was 0101101101111111110000001. To make a 12 pitch character, one duplicate slice of blank data can be omitted, two slices of duplicate data can be removed from the group of eight 1 bits, so that the slice is repeated only six times, instead of eight and one duplicate blank slice at the end is eliminated. The new mask would be: 00110110111111000000. Where the 1 bits should be removed is a subjective decision, largely based upon the character design and aesthetics. The rotated masks for producing the expanded character images of FIGS. 1 through 5, 7 and 8 in the reverse direction are shown in FIG. 11.

With this method, the change in pitches will only require a change in construction of the repetition mask so that each pitch will have its own repetition mask that works on one character generator. This method can be used to derive any pitch desired, as long as there are enough repetitive slices in the characters that can be removed to give the desired pitch.

Figure 12:
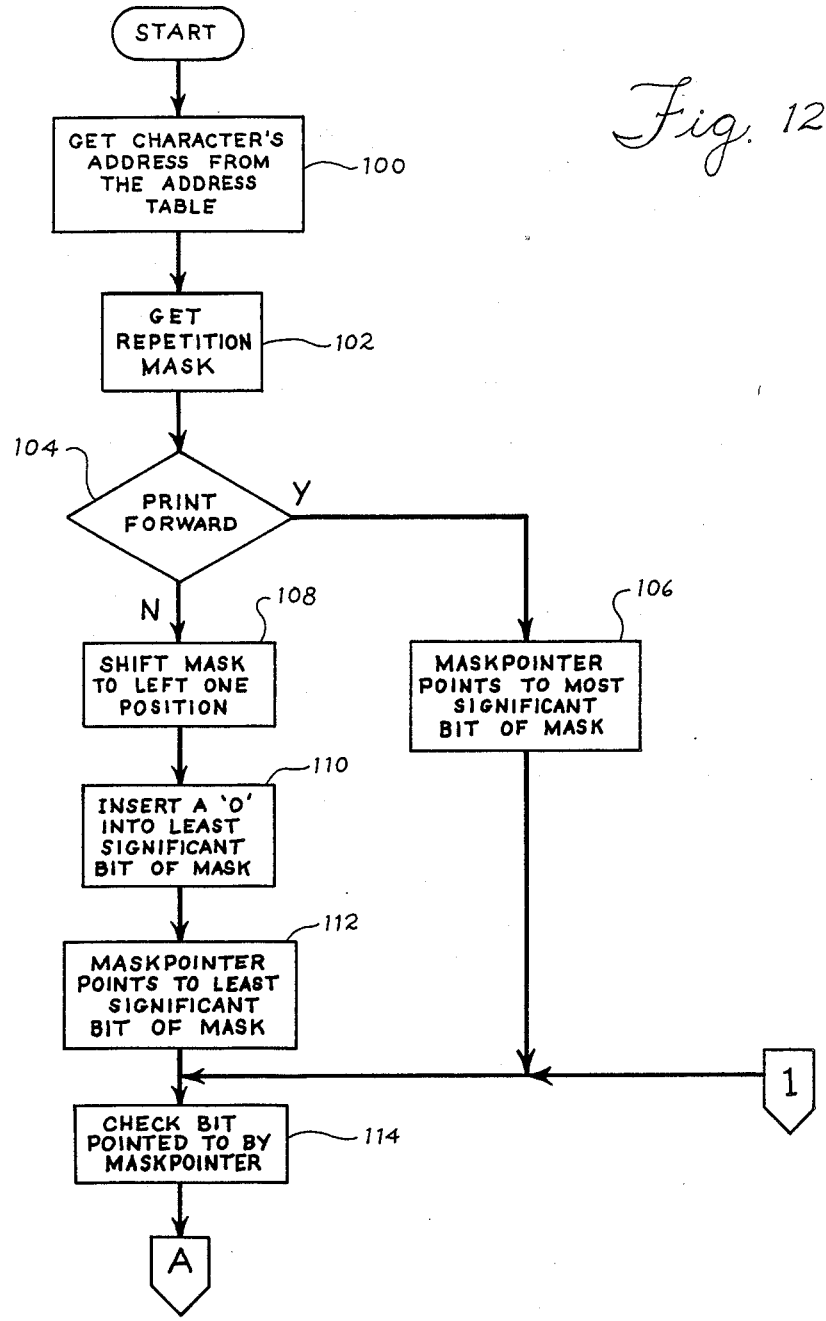
FIGS. 12 through 14 are flow charts illustrating a method for practicing the invention.
Figure 13:
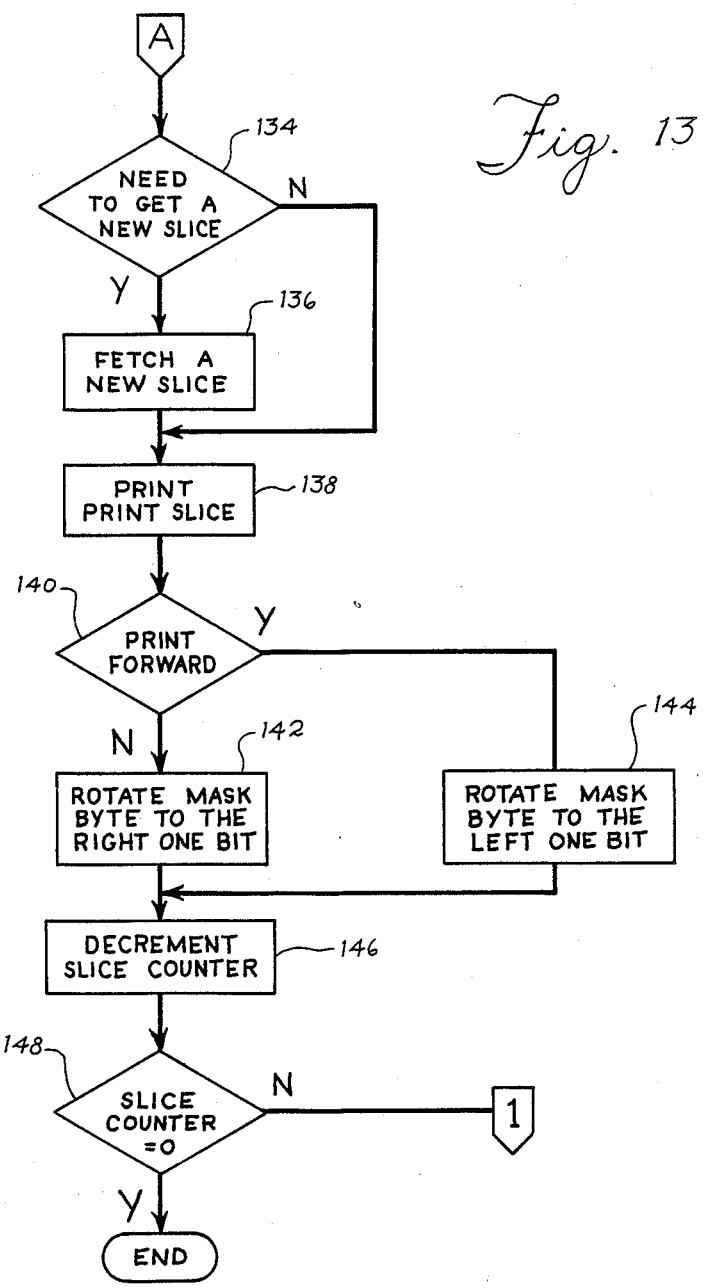
Figure 14:
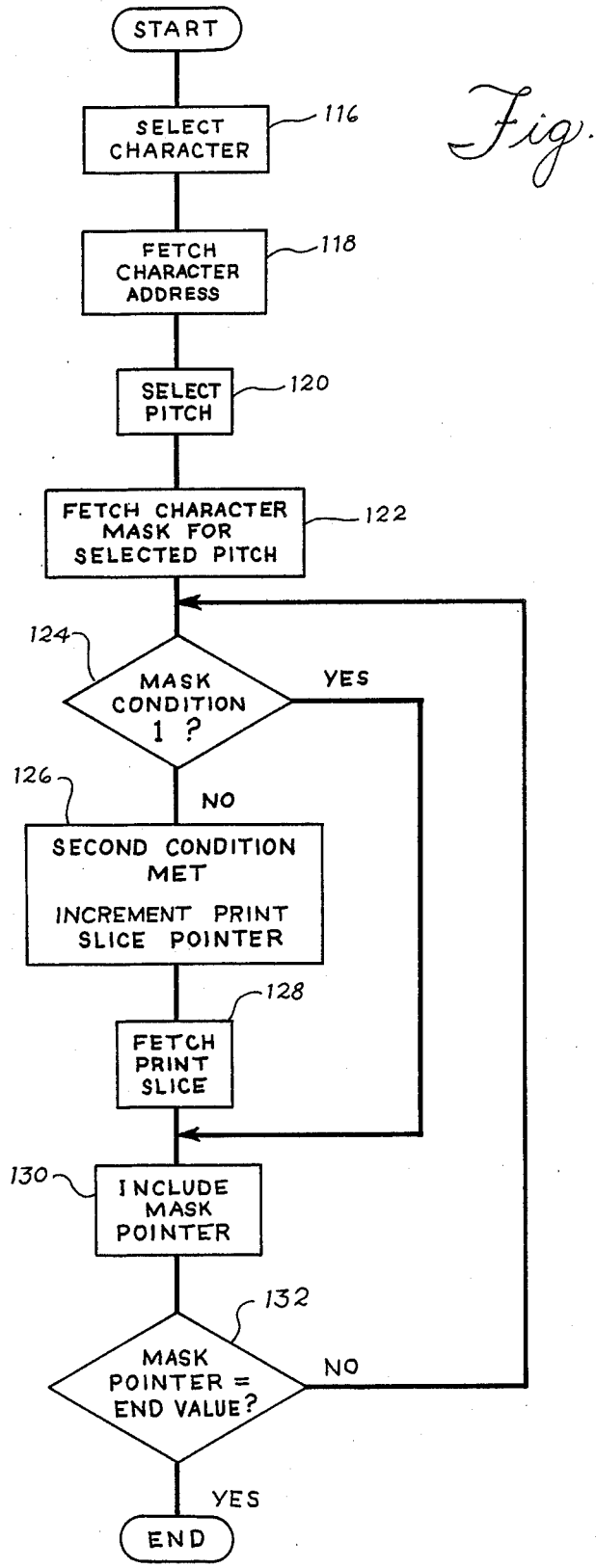

Referring now to FIGS. 12, 13 and 14, a flow chart for implementing a method for practicing the invention will be described. When a selected character to be printed is received, block 100 gets the address of the selected character from an address table. The character address identifies the start memory location, for that character, wherein is stored the mask and the compressed print data in the form of unique print slices.

Next, the repetition mask for the selected character is fetched, block 102. Then, decision block 104 determines whether printing is in either the forward or reverse direction. If printing forward, there is a branch to block 106 to set the mask pointer to point at the most significant bit of the repetition mask. If printing in the reverse direction, a set of three steps are executed to rotate the mask.

In block 108, the repetition mask is shifted by one bit to the left. In block 110 a 0 bit, signifying a new print slice, is inserted into the first rightward position, or least significant bit, of the repetition mask. Next, the mask pointer is reset to point to the least significant bit of the repetition mask, block 112. In block 114, the repetition mask bit pointed to by the mask pointer is identified as either a 1 bit or 0 bit.

Referring now to FIG. 13, if the bit is a 0, then decision block 134 determines that there is a need to get a new slice. The new slice is fetched in block 136. If the bit is a 1, no new print slice is needed and the step of block 136 is omitted. The print slice is printed in block 138.

In decision block 140, the print direction is again determined. If printing forward, or rightward, the mask is shifted by one bit to the left in block 144. If printing leftward, or in the reverse direction, the mask is shifted one bit to the right, block 142. In block 146, the print slice counter, which is initially set to a predetermined value equal to the number of print slices in a character, is decremented by one in block 146. If the counter is zero, decision block 148, the character has been printed and the method ends. If there are more print slices to be printed, the counter is greater than zero, there is a return to entry point 1, FIG. 12. It will be understood by those having skill in the art that printing of bit slices need not be performed at block 138, but rather all print slices for a character or a plurality of characters may be accumulated in a print slice buffer and printed when the buffer is full.

Referring now to FIG. 14, the invention for providing printed characters in one of a plurality of pitches will be described. A character is selected in block 116 and the character address is fetched in block 118. In block 120, a pitch is selected from a multiplicity of pitches and in block 122, the appropriate mask for the selected character and pitch is fetched.

Decision block 124 determines the condition of the mask bit. If the mask bit is in a first condition or state, signifying a duplicate print slice, the steps of blocks 126 and 128 are omitted. If the mask bit is in a second condition or state, signifying a new print slice, the print slice pointer is incremented by one, block 126 and the new print slice is fetched.

In block 130, the mask pointer is incremented by one and in decision block 132 the mask pointer is tested to determine whether the last print slice has been generated.

The pitch selection feature has been described without reference to the details of bidirectional printing to point out this specific feature of the invention more clearly. Those skilled in the art are fully capable of integrating the methods of FIGS. 12 and 13 with FIG. 14.

Figure 15:
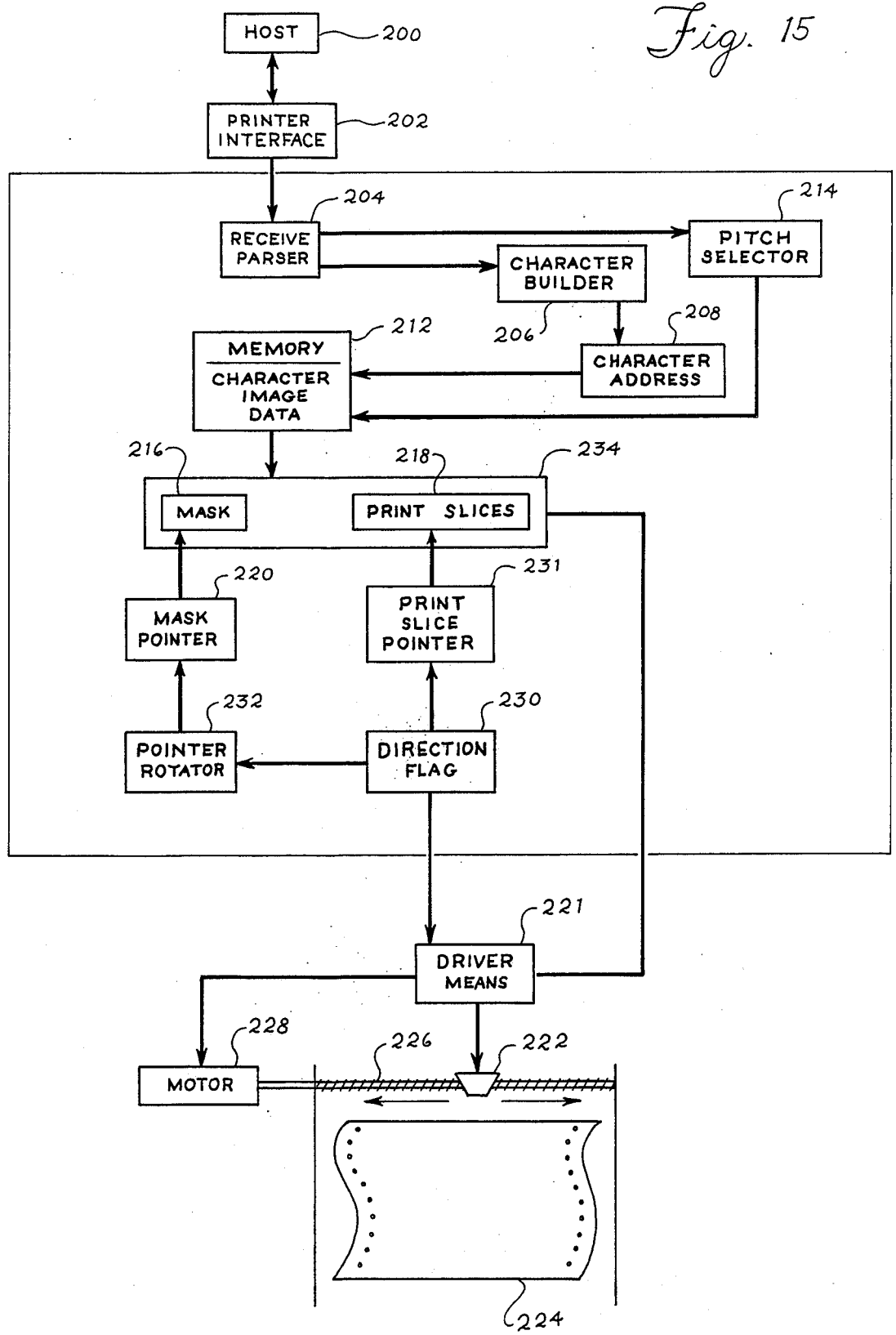
FIG. 15 shows an apparatus for practicing the invention.

Referring now to FIG. 15, an apparatus for practicing the invention will be described. A host 200, such as an IBM Personal Computer, communicates with a printer of the present invention via printer interface 202. Receive parser 204 receives a data stream comprised of character and pitch information, from interface 202 and identifies the characters to be printed and the selected pitch. The character information is loaded into character builder 206 and the pitch information is loaded in pitch selector 214. Builder 206 selects the appropriate character address from address table 208. The character address identified in table 208 is the start address of the character area in memory 212 associated with the selected character. The particular mask to be used in generating the character image is identified by pitch selector 214, which communicates with memory 212, to select a repetition mask for the selected character. The selected character image data, comprised of a mask and print slice da&a is loaded into character image generator 214. A bit of mask 216, identified by mask pointer 220, is examined. The first bit of mask 216 will always be a 0 bit signifying a new print slice. Character image generator 234 passes the print slice to driver means 221 which controls motor 228 and print element 222 for printing on record medium 224.

Print element 222 is bidirectionally moveable across record medium 224 along helix 226 driven by stepper motor 228. Stepper motor 228 is under the control of direction flag 230. When flag 230 is set to drive print element 222 in a leftward or reverse direction, mask pointer rotator 232 is activated to rotate mask pointer 220 and print slice pointer 231 to point initially to the opposite position of buffer 218.

Still referring now to FIG. 15, reconstruction of the original character image is made very easy with the repetition mask 216. With reference to the mask, a 0 indicates a new or unique slice while a 1 indicates a repeated slice. In order to print the character B, memory 212 receives the address for the B character from the address table 208. The address in the address table points to the start of the character B area. The first three bytes in the character B area are the repetition mask for that character. The character image generator examines the first bit of the three byte mask which will always equal 0, since an initial print slice of data has to be fetched from the character generator. After fetching the initial print slice the character generator will then examine the next bit of the repetition mask. If the bit is a 1 then the print slice that was previously fetched is to be printed again and no fetch of print slice data occurs. As long as the repetition mask bit for a print slice is a 1, no print slice data is fetched from the character generator. When a print slice has a repetition mask bit equal to 0, then the print slice to be printed is a new print slice that must be fetched from the character generator.

Referring now to FIGS. 1 and 6, the method for constructing compressed characters and the associated repetition mask will be explained. The first step is to identify the first print slice of a series of repetitive print slices and any unique print slices of the character. In the example of FIG. 1 the first print slices are 1, 3, 6, 9, 18, 19, 20, 21, 22 and 23. The next step is to identify the duplicate slices and in the example they are 2, 4, 5, 7, 8, 10–17 and 24. The compressed character would therefore comprise the 10 first print slices of data, as shown in FIG. 6. The repetition mask for construction the character of FIG. 1 would be as follows:

| Print Slice | = | 1 1 1 1 1 1 1 1 1 1 2 2 2 2 2 |
| --- | --- | --- |
| | | 1 2 3 4 5 6 7 8 9 0 1 2 3 4 5 6 7 8 9 0 1 2 3 4 |
| First(v)/Repetition | = | U R U R R U R R U R R R R R R R R U U U U U U R |
| Mask | = | 0 1 0 1 1 0 1 1 0 1 1 1 1 1 1 1 1 0 0 0 0 0 0 1 |

For other characters, the procedure would be the same.

From the above description it will be understood by those having skill in the art that according to the present invention, characters may be stored in a printer with reduced character storage generation size compared to prior art storage techniques. By storing only the non-repetitive bit slices and the unique mask of the present invention, various character pitches and bidirectional printing may also be accommodated with little overhead.

While the invention has been particularly shown and described with reference to a preferred embodiment, it will be understood by those skilled in the art that various other changes in form and detail may be made without departing from the spirit and scope of the invention.

We claim:

1. A method of constructing a fully formed character out of print slices for a matrix printer comprising the steps of:
    (a) selecting a character to be printed from a plurality of characters;
    (b) selecting a compressed character, associated with said selected character, containing a set of only the first print slice of a series of repetitive print slices and any unique print slices of said fully formed character wherein said set of print slices of said compressed character are fewer in number than said print slices of said fully formed character;
    (c) selecting a mask, associated with said compressed character, from a plurality of said masks, each of said masks having a plurality of bits in either a first state or second state, each of said bits being associated with one of said print slices so that there is a one-to-one correspondence between the number of bits of said mask and the number of slices of said fully formed character;
    (d) testing each bit of said mask, to detect for either said first state or said second state;
    (e) fetching a new one of said first or unique print slices, when said first state is detected;
    (f) omitting the previous step when said second state is detected; and
    (g) printing the fetched print slices.

2. A method of constructing a fully formed character out of print slices for a matrix printer comprising the steps of:
    (a) selecting a character to be printed from a plurality of characters;
    (b) selecting a pitch, for said character to be printed, from a plurality of pitches;
    (c) selecting a compressed character, associated with said selected character, containing a set of only the first print slice of a series of repetitive print slices and any unique print slices of said fully formed character wherein said set of print slices of said compressed character are fewer in number than said print slices of said fully formed character;
    (d) selecting a mask, determined by said selected character to be printed and said selected pitch, from a plurality of said masks, each of said masks having a plurality of bits in either a first state or second state, each of said bits being associated with one of said print slices so that there is a one-to-one correspondence between the number of bits of said mask and the number of slices of said fully formed character;
    (e) testing each bit of said mask, to detect for either said first state or said second state;
    (f) fetching a new one of said first or unique print slices, when said first state is detected;
    (g) omitting the previous step when said second state is detected; and
    (h) printing the fetched print slices.

3. A method of constructing a fully formed character out of print slices for a bidirectional matrix printer comprising the steps of:
    (a) selecting a character to be printed from a plurality of characters;
    (b) selecting a compressed character, associated with said selected character, containing a set of only the first print slice of a series of repetitive print slices and any unique print slices of said fully formed character wherein said set of print slices of said compressed character are fewer in number than said print slices of said fully formed character,
    (c) selecting a mask, associated with said character to be printed, from a plurality of said masks, each of said masks having a plurality of bits in either a first state or second state, each of said bits being associated with one of said print slices so that there is a one-to-one correspondence between the number of bits of said mask and the number of slices of said fully formed character;
    (d) determining whether said selected character is to be printed in either a forward direction or a reverse direction;
    (e) testing a first bit of said mask and thereafter testing the remaining bits of said mask in a forward order for said forward direction and in a reverse order for said reverse direction to detect for either said first state or said second state;

(f) fetching a new one of said first or unique print slices, when said first state is detected;
(g) omitting the previous step then said second state is detected; and
(h) printing the fetched print slices.

4. A method of constructing a fully formed character out of print slices for a bidirectional matrix printer comprising the steps of:
(a) selecting a character to be printed from a plurality of characters;
(b) selecting a pitch, for said character to be printed, from a plurality of pitches;
(c) selecting a compressed character, associated with said selected character, containing a set of only the first print slice of a series of repetitive print slices and any unique print slices of said fully formed character wherein said set of print slices of said compressed character are fewer in number than said print slices of said fully formed character;
(d) selecting a mask, associated with said character to be printed and said selected pitch, from a plurality of said masks, each of said mask having a plurality of bits in either a first condition or a second condition each of said bits being associated with one of said print slices so that there is a one-to-one correspondence between the number of bits of said mask and the number of slices of said fully formed character;
(e) determining whether said selected character is to be printed in either a forward direction or a reverse direction;
(f) testing a first bit of said mask and thereafter testing the remaining bits of said mask in a forward order for said forward direction and in a reverse order for said reverse direction to detect for either said first condition or said second condition;
(g) fetching a new one of said first or unique print slices when said first condition is detected;
(h) omitting the previous step when said second state is detected; and
(i) printing the fetched print slices.

5. A method for constructing a full formed character out of print slices for a matrix printer comprising the steps of:
(a) selecting a character to be printed from a plurality of characters;
(b) selecting a compressed character, associated with said selected character, containing a set of only the first print slice of a series of repetitive print slices and any unique print slices of said fully formed character wherein said set of print slices of said compressed character are fewer in number than said print slices of said fully formed character;
(c) selecting a mask, associated with said character to be printed, from a plurality of said masks, each of said masks having a plurality of bits in either a first state or second state, each of said bits being associated with one of said print slices so that there is a one-to-one correspondence between the number of bits of said mask and the number of slices of said fully formed character;
(d) testing each bit of said mask, to detect for either said first state or said second state;
(e) fetching a new one of said first or unique print slices, when said first state is detected;
(f) storing the fetched print slices in a print slice buffer;
(g) duplicating the fetched print slice and storing said duplicated print slice in said print slice buffer when said second state is detected; and
(h) printing said print slice buffer, when said print slice buffer is full.

6. A method for constructing a full formed character out of print slices for a matrix printer comprising the steps of:
(a) selecting a character to be printed from a plurality of character;
(b) selecting a pitch, for said characters to be printed, from a plurality of pitches;
(c) selecting a compressed character, associated with said selected character, containing a set of only the first print slice of a series of repetitive print slices and any unique print slices of said fully formed character wherein said set of print slices of said compressed character are fewer in number than said print slices of said fully formed character;
(d) selecting a mask, determined by said selected character to be printed and said selected pitch, from a plurality of said masks, each of said masks having a plurality of bits in either a first state or a second state each of said bits being associated with one of said print slices so that there is a one-to-one correspondence between the number of bits of said mask and the number of slices of said fully formed character;
(e) testing each bit of said mask, to detect for either said first state or second state;
(f) fetching a new one of said first or unique print slices, when said first state is detected;
(g) storing the fetched print slice in a print slice buffer;
(h) duplicating and storing the fetched print slice in said print slice buffer when said second state is detected; and
(i) printing said print slice buffer when said buffer is full.

7. A method for constructing a fully formed character out of print slices for a bidirectional matrix printer comprising the steps of:
(a) selecting a character to be printed from a plurality of characters;
(b) selecting a compressed character, associated with said selected character, containing a set of only the first print slice of a series of repetitive print slices and any unique print slices of said fully formed character wherein said set of print slices of said compressed character are fewer in number than said print slices of said fully formed character;
(c) selecting a mask, associated with said character to be printed, from a plurality of said masks each of said masks having a plurality of bits in either a first state or a second state each of said bits being associated with one of said print slices so that there is a one-to-one correspondence between the number of bit of said mask and the number of slices of said fully formed character;
(d) determining whether said selected character is to be printed in either a forward direction or a reverse direction;
(e) testing a first bit of said mask and thereafter testing the remaining bits of said mask in a forward order for said first direction and in a reverse order for said second direction to detect for either said first state or said second state;

(f) fetching a new one of said first or unique print slices, when said first state is detected;

(g) storing the fetched print slice in a print slice buffer;

(h) duplicating and storing the fetched print slice in said print slice buffer when said second state is detected; and (i) printing said print slice buffer when said buffer is full.

8. A method for constructing a full formed character out of print slices for a bidirectional matrix printer comprising the steps of:

(a) selecting a character to be printed from a plurality of characters;

(b) selecting a pitch, for said character to be printed, from a plurality of pitches;

(c) selecting a compressed character, associated with said selected character, containing a set of only the first print slice of a series of repetitive print slices and any unique print slices of said fully formed character wherein said set of print slices of said compressed character are fewer in number than said print slices of said fully formed character;

(d) selecting a mask, determined by said selected character to be printed and said selected pitch, from a plurality of said masks, each of said masks having a plurality of bits in either a first state or a second state each of said bits being associated with one of said print slices so that there is a one-to-one correspondence between the number of bits of said mask and the number of slices of said fully formed character;

(e) determining whether said selected character is to be printed in either a forward direction or a reverse direction;

(f) testing a first bit of said mask and thereafter testing the remaining bits of said mask in a forward order for said forward direction and in a reverse order for said reverse direction to detect for either said first state or said second state;

(g) fetching a new one of said first or unique print slices, from a group of print slices associated with said character to be printed, when said first state is detected;

(h) storing the fetched print slice in a print slice buffer;

(i) duplicating and storing the fetched print slice in said print slice buffer when said second state is detected; and (j) printing said print slice buffer when said buffer is full.

* * * * *